April 10, 1956  C. VAN DEVENTER III  2,741,516
CLOTH ROLL BEARINGS FOR LOOMS
Filed July 29, 1952
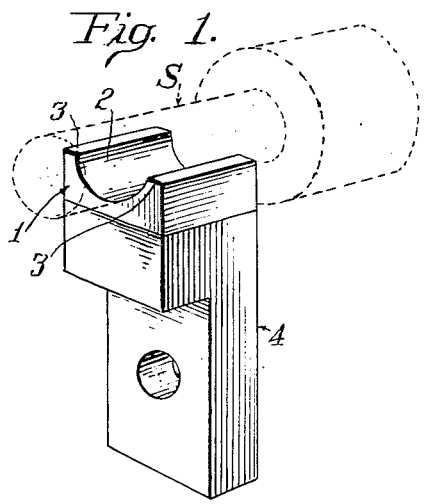
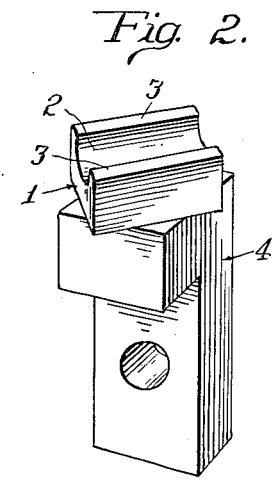
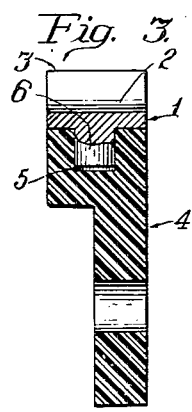
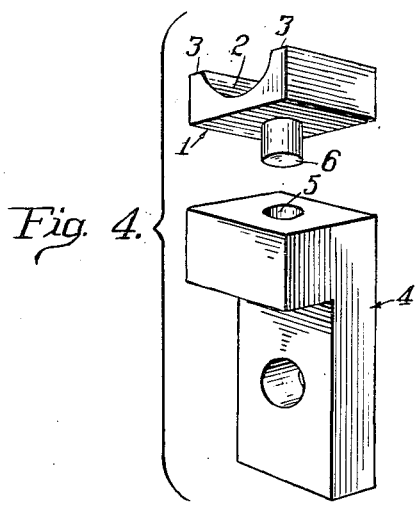
INVENTOR
Christopher VanDeventer III
BY
ATTORNEYS

United States Patent Office 2,741,516
Patented Apr. 10, 1956

2,741,516

CLOTH ROLL BEARINGS FOR LOOMS

Christopher Van Deventer III, Knoxville, Tenn., assignor to National Plastics, Inc., Knoxville, Tenn., a corporation of Delaware Application July 29, 1952, Serial No. 301,500

8 Claims. (Cl. 308—15)

This invention relates to improvements in cloth roll bearings for looms.

The cloth roll of a loom is usually supported at opposite ends in bearings. Such bearings usually have required lubrication heretofore, but the use of a lubricant is objectionable because of its likelihood of contamination of the cloth. Moreover, it is necessary from time to time to remove the cloth roll from the loom, and since the roll with the cloth thereon is relatively heavy and must be lifted out of the loom, considerable difficulty is encountered in its removal due to the aligned nature of the bearings ordinarily provided for supporting opposite ends of the cloth roll.

One object of this invention is to overcome these objections to cloth roll bearings as provided heretofore, and to prevent cloth contamination by lubricant as well as to facilitate the removal of the cloth roll from the loom.

Another object of the invention is to provide a bearing for a cloth roll which is impregnated with a lubricant, or is self lubricating without the necessity for application of a lubricant thereto externally, which will prevent cloth contamination by the lubricant in service.

Still another object of the invention is to provide for self-alignment of the bearing by a swiveled connection between the bearing block and its supporting bracket, or tail piece, whereby the bearing will not only accommodate itself to the alignment of the cloth roll shaft, but also will shift automatically when the cloth roll is removed to facilitate the removal of the latter without the hazard of breaking the flanges on the bearing block.

Another object of having the cloth roll bearing in two parts is to standardize, when possible, with a tail piece consisting of fixed dimensions whereby different sizes of ferrous or non-ferrous head pieces can be used as interchangeable parts on the same tail piece.

These objects may be accomplished, according to one embodiment of this invention, by providing a head piece or bearing block constructed of a ferrous or non-ferrous porous material, or the like, and impregnated with a lubricant or self-lubricated, whereby no external lubricant need be applied thereto in service. The lubrication of the block will not contaminate the cloth and cause spoilage in service, and yet sufficient lubricant will be available for the smooth operation of the cloth roll shaft.

At the same time, I have provided for self-alignment of the bearing block to accommodate itself to the axis of the cloth roll shaft, as well as to facilitate the removal of the roll without the hazard of breaking the bearing block. This is accomplished by the provision of a pin on the bottom of the bearing block, which is inserted into a socket in the tail piece or supporting bracket therefor without the danger of the bearing block jumping off the bracket. A sufficiently close tolerance is provided between the pin and the walls of the socket so that the air will be pushed out of the socket by the introduction of the pin, which thereby creates a sufficient vacuum in the socket tending to hold the pin therein and the bearing block in place on the tail piece. At the same time, the bearing block is free to rotate around the axis of the pin as the cloth roll is applied to or removed from the loom, or during service to provide for proper alignment. Moreover, different sizes of bearing blocks may be used on the same bracket or tail piece.

This embodiment of the invention is illustrated in the accompanying drawings in which:

Fig. 1 is a perspective view of the cloth roll bearing in its normal position when the roll is in place;

Fig. 2 is a similar view showing the position of the bearing block when the roll is shifted for removal;

Fig. 3 is a vertical section therethrough; and

Fig. 4 is a disassembled perspective view of the parts of the bearing structure.

The invention is shown as applied to a cloth roll bearing for looms, but it is recognized that it may be applied to other textile devices and it is not intended to be restricted to looms alone.

In the embodiment illustrated, a bearing block forming the head piece of the bearing is shown generally at 1, having a concave journal seat 2 in the upper face thereof adapted to receive therein the shaft S to be supported and journaled therein, such as the cloth roll shaft of a loom.

I prefer to use a porous composition of ferrous or non-ferrous material, such as bronze, for the bearing block 1, which preferably is impregnated with lubricant so as to be of the character known as "self-lubricating." This confines the lubricant to the surface of the journal seat 2, where it can lubricate the shaft S sufficiently, and yet an excess of lubricant is not available for contaminating the cloth. The flanges 3 on opposite sides of the journal seat 2 hold the cloth roll in place sufficiently so as not to require the use of a cap or bearing plate thereover.

The bearing block 1 is shown as supported upon a tail piece in the form of a bracket 4, adapted to be secured to any suitable part of a loom or other device, where the invention may be used. It is preferable that the bracket 4 be formed of plastic material, such as thermo-setting plastic, which will not flake off or break and will maintain a closer dimensional stability and have a higher moisture resistence in general, and yet will have the function and property of holding the bearing block in place thereon while permitting swiveling of the bearing block relative thereto.

This is accomplished by providing a socket 5 in the top face of the bracket 4, upon which the bearing block 1 is seated. A pin 6 on the bottom face of the bearing block 1 extends into the socket 5, and is swiveled therein. This pin 6 is made of a size relative to the socket 5 so as to have a close sliding fit in the latter, the tolerance therebetween being sufficiently small so that the act of pushing the pin into the socket will substantially completely exclude the air therefrom and thereby provide a sufficient suction or vacuum in the socket, tending to hold the pin therein. This vacuum will be sufficient to prevent accidental displacement of the bearing block 1 off the bracket 4 and at the same time it will not prevent swiveling of the bearing block relative to the bracket, allowing it to swing, as an example, from the position shown in Fig. 1 to the position shown in Fig. 2.

This structure not only will allow the bearing block to swivel sufficiently to permit the bearing block to accommodate itself to the alignment of the shaft S, but it will also rotate so as to permit the cloth roll to be removed readily without the hazard of breaking the flanges 3, as has been an objection heretofore with cloth roll bearings as used. At the same time the structure is held in place without danger of accidental displacement and is adequately lubricated so as to prevent cloth contamination by lubricant.

Moreover, the device provides a cloth roll bearing made in two parts, whereby it may be standardized with tail piece which may be made of fixed dimensions, while different sizes of head pieces can be used interchangeably on the same tail piece.

While the invention is illustrated in one embodiment, it is recognized that variations and changes may be made therein without departing from the invention as set forth in the claims.

I claim:

1. A bearing comprising a rigid plastic supporting structure, a bearing block rotatably seated thereon and having a journal seat therein, said bearing block being formed of porous metal impregnated with lubricant.

2. A bearing comprising a plastic supporting structure, a bearing block seated thereon and having a journal seat therein, said bearing block being formed of porous metal impregnated with lubricant, said supporting structure having a socket therein with a closed bottom, and a pin fixed to the bearing block and inserted in the socket throughout substantially the depth thereof with a sufficiently close tolerance therebetween to create suction tending to prevent removal of the pin from the socket.

3. A bearing comprising a supporting structure having a socket therein with a closed bottom, a bearing block seated on the supporting structure and having a journal seat for a shaft, and a pin fixed to the bearing block and inserted in the socket throughout substantially the depth thereof, said pin having a close fit in the socket with the bottom of the pin close to the bottom of the socket tending to prevent removal of the pin therefrom by vacuum.

4. A bearing comprising a supporting structure having an upper face with a socket therein with a closed bottom, a bearing block seated upon said upper face and having a journal seat for a shaft, and a pin on the bottom face of the bearing block inserted into the socket throughout substantially the depth thereof substantially filling the socket throughout with a close sliding fit therewith to exclude air from the socket as the pin is introduced and creating a vacuum therein against the accidental removal of the pin therefrom while permitting rotation of the pin in the socket.

5. A bearing comprising a supporting structure having an upper face with a socket therein with a closed bottom, a bearing block seated upon said upper face and having a journal seat for a shaft, and a pin on the bottom face of the bearing block inserted into the socket throughout substantially the depth thereof substantially filling the socket throughout with a close sliding fit therewith to exclude air from the socket as the pin is introduced and creating a vacuum therein against the accidental removal of the pin therefrom while permitting rotation of the pin in the socket, said supporting structure being formed of plastic material, and the block and pin being formed of metal.

6. A bearing comprising a supporting structure having an upper face with a socket therein with a closed bottom, a bearing block seated upon said upper face and having a journal seat for a shaft, and a pin on the bottom face of the bearing block inserted into the socket throughout substantially the depth thereof substantially filling the socket throughout with a close sliding fit therewith to exclude air from the socket as the pin is introduced and creating a vacuum therein against the accidental removal of the pin therefrom while permitting rotation of the pin in the socket, said supporting structure being formed of plastic material, and the block and pin being formed of metal, said block being impregnated with lubricant.

7. A bearing comprising a pair of members in cooperative engagement with each other one of which is adapted to be secured on a support and the other being adapted to support a journal for a shaft, and means for connecting said members together including a pin fixed on one member, the other member having a socket therein with a closed bottom and receiving the pin therein, said socket being of a depth and size substantially to fit the pin and to retain the pin therein by suction.

8. A bearing comprising a pair of members in cooperative engagement with each other one of which is adapted to be secured on a support and the other being adapted to support a journal for a shaft, and means for connecting said members together including a pin fixed on one member, the other member having a socket therein with a closed bottom and receiving the pin therein, said socket having a close sliding fit with the periphery of the pin and having a depth substantially equal to the length of the pin in the socket to retain the pin therein by suction.

References Cited in the file of this patent

UNITED STATES PATENTS

| | | |
|---|---|---|
| 1,124,986 | Widdup | Jan. 12, 1915 |
| 1,302,757 | Barber | May 6, 1919 |
| 1,966,186 | Remnsnider | July 10, 1934 |
| 1,985,781 | Hufferd et al. | Dec. 25, 1934 |
| 2,289,628 | Conant et al. | July 14, 1942 |
| 2,315,301 | Van Deventer III et al. | Mar. 30, 1943 |
| 2,496,765 | Williams | Feb. 7, 1950 |
| 2,562,595 | Blue | July 31, 1951 |
| 2,614,005 | Rossman | Oct. 14, 1952 |